United States Patent Office 3,011,896
Patented Dec. 5, 1961

3,011,896
FLUID SHORTENING AND PROCESS
FOR MAKING THE SAME
Fred Eber, Northbrook, Melvin L. Ott, Park Ridge, Walter M. Cochran, Highland Park, and Henry J. Kean, Wheeling, Ill., assignors to The Glidden Company, Cleveland, Ohio, a corporation of Ohio
No Drawing. Filed Jan. 19, 1960, Ser. No. 3,276
19 Claims. (Cl. 99—118)

This invention relates to an improved fluid shortening, a process for making it, batter and dough admixtures employing it, and a lactated monoglyceride-providing composition especially suitable for it.

In this specification we shall speak of the "functional properties," "baking," or "performance" as meaning the way a shortening performs to make baked goods, i.e., a shortening with good functional properties being one which makes a dough or batter that can produce a good baked product. We shall also speak of the "handling properties" or "stability" of a fluid shortening. A fluid shortening with good handling properties (or good stability) is defined here as one which retains its desirable fluid character when handled, stored, or used at normal use temperatures, i.e., 60–90° F., and is readily pourable by gravity from a container in this temperature range. Furthermore, to have good handling or stability properties a fluid shortening should be one having its solid particles evenly dispersed in fine suspension in its oily vehicle in this temperature range and neither exhibiting an oil "break" (which is a stratification or separation of oil at the top to any substantial degree) nor a substantial settling out of solids when properly handled or stored in this temperature range.

Advantages of our improved fluid shortening over a conventional plastic shortening with respect to handling properties are, of course, manifest. The fluid can be poured, pumped, and metered without having to be melted down on one hand or dug out of a mass on the other. Many previous fluids sold for shortening purposes have had this advantage over plastic shortenings, but were deficient in functional properties as against plastic shortening. Our improved fluid shortening, as will be shown hereinafter, is superior in functional properties, not only to previous fluid or liquid shortenings, but also to conventional plastic shortenings. Unless otherwise expressly indicated herein all percentages are weight percentages and all fractions are weight fractions.

Broadly, the improved fluid shortening of our invention consists essentially of: about 0.2% to about 3% of unlactated normally solid glyceride; about 89% to about 95.8% of a normally liquid glyceride vehicle; and about 4% to about 8% of a lactated monoglyceride-providing composition, said composition having about 2% to about 50%, basis the composition, as free monoglyceride of $C_{14-22}$ saturated fatty acid, the lactated monoglyceride of said composition being an esterification product of lactic acid with at least one concentrated, preformed monoglyceride of $C_{14-22}$ saturated fatty acid and containing about 0.4 to about 2 mols of combined lactic acid per mol of starting monoglyceride reactant, said fluid shortening being pourable at a temperature as low as 60° F. and exhibiting an increase in solids content of at least 50% when cooled from 90° F. to 60° F.

Our fluid shortening is an opaque suspension of finely divided solids in the normally liquid glyceride vehicle. It exhibits excellent physical stability in the temperature range of 60–90° F. and is pourable by gravity in this temperature range even though the solids content decreases with rising temperature and increases with decreasing temperature to quite a marked degree.

A further aspect of this invention is a process for making this improved fluid shortening, the process comprises: forming a clear melt of about 0.2 to about 3% of normally solid glyceride, about 89% to about 95.8% of normally liquid glyceride vehicle, and about 4% to about 8% of the foregoing lactated monoglyceride-providing composition, cooling said melt to a temperature sufficiently low to generate a magma of fine crystals; tempering said magma in an agitated tempering zone until the crystals present are in a stable condition; withdrawing the tempered magma from the tempering zone; and maintaining the resulting mixture under conditions precluding substantial aeration of the product during the aforesaid cooling, tempering, and withdrawing steps. Observation of the foregoing conditions gives the necessary reproducible results for large scale manufacture of the shortening.

A still further aspect of this invention is our process for making improved batter and dough admixtures comprising flour, sugar and about 3–70% of our fluid shortening based on the weight of flour in such admixture. The flour and sugar, optionally with other baking ingredients, can be premixed as in a packaged dry mix for compounding with our fluid shortening, or can be compounded therewith as separate ingredients. Our fluid shortening is eminently suitable for such dry mix package unit because it can be packed in its own container and sold as part of the unit. It blends easily by hand with the dry mix. Accordingly, "instant-type" mix package units are possible with many dry mix recipes using our shortening, i.e., our liquid shortening and the "wet" ingredients (e.g. water, whole or skim milk, whole eggs or fresh egg fractions, liquid flavors and colors, etc.) are blended with the dry ingredients of the package unit in a single operation.

A yet further aspect of our invention is said lactated monoglyceride-providing composition itself, which is especially suitable for incorporation into fluid shortening and baked goods.

In some recipes such as pie dough and certain cakes, the optimum proportion of shortening is quite high, and in others, e.g. sweet doughs, the proportion of the shortening can be quite low. The fluid shortening of our invention imparts desirable qualities to such admixtures and the resulting baked goods therefrom. Our fluid shortening is especially valuable for making "high ratio" cakes, that is those having substantially more sugar than flour in their recipes. White cakes are especially sensitive to the functional properties of a shortening.

While it has been generally recognized that the function of a shortening in such cake batter is to entrap fine air or other gas bubbles in the batter, attainment of such end has not been easy or necessarily broadly successful heretofore. The excellent performance of our fluid shortening in this regard and in many others will be amply demonstrated in the examples below.

Our fluid shortening is especially useful for making two-stage batters (which is a desirable abbreviation of the usual multistage batter-compounding techniques) for cupcakes, pound cakes, slab cakes and layer cakes. The shortening is also extremely advantageous in formulating refrigerated and frozen batters and also in making up packaged mixes. Additionally, our fluid shortening is excellent in making doughs for pie crust, patty shells, sweet rolls, cookies, and yeast-raised doughs.

The normally liquid glyceride vehicle useful in our improved fluid shortening can be derived from a number of naturally occurring liquid glyceride oils including, for example cottonseed oil, soybean oil, peanut oil, safflower oil, sunflower oil, sesame seed oil, and corn oil. Preferably we use a refined, bleached deodorized, but not winterized liquid soybean oil for efficiency and economy in the practice of our invention. Only a trace of normally solid glycerides (below 0.2%) occurs in such preferred oil. Advantageously also, we have used refined cottonseed oil.

The more highly unsaturated oils are useful in providing essential (unsaturated) fatty acids and, therefore, can be used to special advantage for this purpose in the formulation of the shortening. The liquid oil fractions obtained from palm oil, lard, or tallow by a process such as solvent fractionation or graining or direct interesterification, followed by separation of the oil, are also suitable for use as our vehicle. In some cases it is desirable to lightly hydrogenate certain of the highly unsaturated oils to maintain flavor thereof.

The refined and winterized oils (salad oils) in general are very good vehicles. In refining the oil it ordinarily is degummed, treated with caustic soda to neutralize the free fatty acids, dehydrated and bleached with fuller's earth or activated charcoal, then stripped with steam under vacuum.

For accurate reproducible process control and product quality it is important to use a glyceride oil vehicle in our process which is clear and limpid at 75–80° F., that is it exhibits no cloudiness by the A.O.C.S. Official Method of Cloud Testing ($C_c$ 6–25). A substantial fraction (e.g. 0.5–3%) of normally solid glycerides, i.e. those which remain solid at temperatures of about 100° F., that are indigenous to the vehicle can be compensated for. However, their varying concentrations and qualities when going from batch to batch of the same kind or different kinds of suitable oil vehicle detract from the smoothest routine manufacturing process control and product uniformity, and so render their use less desirable.

Suitable vehicles can include also the conventional low molecular synthetic fats which are substantially liquid at 60° F., e.g. certain di- or triglycerides in which one or two hydroxyl groups of the glyceride are replaced by $C_{2-5}$ saturated fatty acids and one or two of the remaining hydroxyl groups are replaced by acyl radicals of higher molecular weight saturated or unsaturated fatty acids having from 12–20 carbons. Preferably, for resisting rancidity, the high molecular weight fatty acid radicals in such low molecular synthetic fats should not have more than two carbon-to-carbon double bonds, e.g. the fats of the oleic series. While the vehicle oil preferably is refined soybean oil, it can be composed, of course, of mixtures of any of the foregoing oils.

The unlactated normally solid glycerides useful in our invention are those which are not lactated or otherwise modified with hydroxy carboxylic acids and which remain solid at temperatures as high as about 100° F. As such glycerides generally are predominantly higher fatty acid triglycerides, the term "stearine" as used in this specification is intended to be synonymous with such unlactated normally solid glycerides, although it should be understood that some unlactated diglycerides can be present in the useful stearines if their melting point is high enough. While such stearines are broadly insoluble in the liquid oil vehicle in the temperature range 60–90° F., their intimate mixture with our lactated monoglyceride-providing composition discussed hereinafter can modify their normal solubility in the oil to some extent and make the handling of the fluid shortening delicate and somewhat unpredictable unless the proportion of normally solid unlactated glyceride in our fluid shortening is carefully controlled.

While the proportion of stearine used in our liquid shortening can be sufficient to assist possibly in the entrapment of air or other gas into cake batter or the like, we have observed very little appreciable overall stearine effect on the quality of baked goods from our testing. The main stearine effect we have observed, however, is that of its maintaining the stability or good handling properties of our fluid shortening in the temperature range of 60–90° F.

While not intending to be bound by any theory as to reasons for such enhanced handling properties, we think that the stearine fraction of our fluid shortening tends to provide a reproducible, stable crystal matrix or "memory" for the widely fluctuating precipitation of solids in our shortening as the temperature of the shortening varies in its normal handling.

Actually, if our shortening is cooled substantially below about 50° F., it tends to become extremely thick and finally to set up solid. However, when it is warmed again to 60–90° F., it exhibits its original stable, fluid character without any apparent impairment in either handling or in functional properties. However, when our fluid shortening is heated to temperatures substantially above 100° F. and allowed to cool in the absence of the sequence of processing steps we have outlined, the shortening is quite liable to set up in an undesirable plastic or semi-plastic mass and thereby lose its desirable handling characteristics.

The use of at least about 0.2% by weight of stearine in our fluid shortening is necessary for obtaining consistently good handling properties and for avoiding gelling or plasticizing troubles. Substantially more than about 3% of stearine in our fluid shortening, however, increases the thickness or viscosity of the resulting shortening to an undesirable degree, and this leads to handling difficulties. Advantageously, the stearine proportion in our fluid shortening is 0.5–2%, and preferably it is about 1%.

The better normally solid unlactated glycerides (stearines) useful in our process are those substantially saturated to resist oxidation. The iodine value in such instance is generally below 20, advantageously between 0 and 15, and preferably below 10. Usually such stearines are made by hydrogenation or "hardening" of a vegetable or animal fat (or fat fraction) with hydrogen, the iodine value frequently being below 5, even below 1–3, but rarely not much lower for economy.

The stearine or part of it can be, however, a normally hard fraction indigenous to a particular fat. Some or all of the stearine can be obtained by using a rearranged and solvent extracted vegetable or animal fat, as for example, fraction B shown in Examples 1 and 2 of U.S. Patent 2,898,211 or a desirably hard fraction obtained by solvent fractionation in a process such as that described in U.S. Patent 2,903,363. At least a portion of the normally liquid vehicle and normally solid unlactated glyceride can be prepared from fats and fatty oils by random rearrangement, or by directed rearrangement as described, for example, in U.S. Patent 2,442,531. Other rearrangement techniques suitable for making useful stearine are described in U.S. Patents 2,855,310 and 2,855,311.

While sufficient of a suitable normally solid unlactated glyceride (stearine) for use in our fluid shortening can be indigenous to a particular oil vehicle used, or can accompany a particular lactated monoglyceride-providing composition used and thereby be compounded into our fluid shortening in those ways, for best control of manufacture we have found it advantageous to add the stearine as a separate, measured quantity of a substantially completely saturated triglyceride fat made by hydrogenating vegetable or animal oil, e.g. cottonseed oil, soybean oil, sunflower seed oil, linseed oil, hazelnut oil, peanut oil, olive oil, corn oil, palm oil, lard, tallow, or a mixture of these. For economy and efficiency in the practice of our invention, a cottonseed stearine having an iodine value below 5 (generally about 1–3) is preferred.

The lactated monoglyceride-providing composition used in our fluid shortening must be at least about the 4% level (basis shortening) to give truly superior performance in the baked goods. The good functional characteristics of the shortening in baking drop off quite rapidly when substantially less than 4% of the lactated monoglyceride-providing composition is used. Preferably about 6% of the lactated monoglyceride-providing composition is used in the shortening, and as much as about 8% can be used. Beyond about 8% we have observed that the baking performance is no better and often poorer, and the handling properties of the shortening are deleteriously affected.

The lactated monoglyceride-providing composition used in our invention is made by reacting a food processing grade of lactic acid with a monoglyceride of at least one and ordinarily a mixture of $C_{14-22}$ fatty acids to obtain a product containing 0.4 to 2 mols of combined lactic acid per mol of starting monoglyceride reactant. Lactated products with less than about 0.4 mol of combined lactic acid per mol of starting monoglyceride reactant lose functionality for baking cakes; they more nearly resemble the conventional straight monoglycerides (which are often incorporated into shortening by themselves or mixed with diglycerides as from a superglycerinated fat, and which, while helpful, do not exhibit the superior properties for baking that are found with our liquid shortening).

Substantially above about two mols of combined lactic acid per mol starting monoglyceride reactant gives a lactated material which is quite soluble in the normally liquid vehicle, but its use causes the fluid shortening to lose stability, and, even worse, to lose creaming properties with respect to incorporation of air or gas, and thereby be deficient on functional grounds.

The particular lactated monoglyceride product of our invention not only is easily incorporated into the fluid shortening formulation (as opposed to hexitol and hexitan additives and the various lactated esterification products similar to the one we use, i.e., those made by reacting together in conventional manner a mixture of lactic acid, one or more free fatty acids, and glycerine on the one hand, or a mixture of lactic acid and superglycerinated fat on the other hand), but it also gives superior baking performance at substantially lower levels in the resulting shortening than such similar lactated esterification products.

Thus, at 6% level in the shortening our particular lactated monoglyceride-providing composition is about optimum in all respects and at this level the similar esterification products mentioned are either not as effective or not effective at all. Such similar esterification products require ordinarily above about 8% or usually about 10% to approach equivalent performance in baking, and such high concentration in the resulting liquid shortening imparts to it loss of fluidity, high cost, and intolerance to temperature variations for handling.

The concentrated preformed monoglyceride reactant for making our lactated monoglyceride-providing composition is most readily produced by reacting hydrogenated vegetable or animal fat or oil with glycerine in the presence of an alcoholysis catalyst, and thereafter separating the purified and concentrated monoglyceride portion of the alcoholysis reaction product by a thin film high vacuum distillation. Such distillation process is described in U.S. Patents 2,634,234, 2,634,278 and 2,634,279. The monoglyceride for concentration can also be produced by reacting glycerine with free fatty acid, if desired.

The monoglyceride reactant can be derived from animal or vegetable sources, suitably by hydrogenation as mentioned above, or by molecular rearrangement and solvent fractionation, or other conventional processing of the various hard indigenous or hydrogenated materials as described above in connection with the useful stearines. Thus, fats for conversion into our preformed, concentrated monoglyceride can be derived from, for example, straight or mixed cottonseed, soybean, lard, corn, tallow and peanut fat products, and they can be rearranged or can be fractions made by pressing or solvent fractionation of such fat products wherein their resulting monoglycerides are monoglycerides of $C_{14-22}$ fatty acids, singly or mixed. The term "fatty acid" as used herein is to be distinguished from "essential fatty acid," and it denotes one that is saturated and of the stearic acid series, but substantial amounts (e.g. 5–40%) of the monoglycerides of unsaturated fatty acids, e.g. having acid radicals of the oleic acid series in this carbon chain range, can be present. While lower in oxidative stability, such monoglycerides are usable along with and as part of the saturated fatty acid monoglycerides for our purposes. The higher saturated fatty acid monoglycerides, e.g. the $C_{16-22}$ fatty acid monoglycerides appear to be especially advantageous for obtaining the best functional (baking) properties, but some $C_{14}$ and $C_{24+}$ fatty acid monoglycerides and even lower and higher fatty acid monoglycerides in small proportions are to be expected in many of the lactated monoglyceride-providing compositions useful for our purposes because of having natural origins.

Preferably the monoglycerides for use in our shortening are derived from hydrogenated lard, tallow, cottonseed oil, or soybean oil and the great preponderance (above 90%) of fatty acid monoglycerides therefrom will be $C_{16-18}$ saturated fatty acid substances, e.g. about 40–80% stearic acid monoglyceride and about 20–60% palmitic acid monoglyceride, although virtually pure fatty acid monoglyceride substances, e.g. glyceryl monostearate or monopalmitate, can be used with excellent results as the monoglyceride instead of a mixture. The lactated monoglyceride-providing composition must contain some free monoglyceride of $C_{14-22}$ fatty acids to obtain the best baking performance. Thus it is particularly important to have a significant fraction (at least about 2%) of free fatty acid monoglyceride in the lactated monoglyceride-providing composition. This will be discussed more in detail hereinafter.

Our lactated monoglyceride esterification product seems to give extremely fine crystals in our liquid shortening as the temperature of the shortening declines from 90° to 60° F. This, of course, makes for enhanced pourability and stability of the shortening. The lactated monoglyceride esterification product is expressed in terms of combined lactic acid and mols of starting monoglyceride because these are readily ascertainable quantities from conventional analysis and from weighting. The lactation reaction ordinarily is done at elevated temperatures of 200–400° F., and the water of reaction is removed by distillation in conventional manner, e.g. by reduced pressure operation, inert gas stripping, and/or solvent entrainment. Near the end of a run use of the higher temperatures and of reduced pressure, e.g. 100 mm. Hg or less, and even going down 1–5 mm. Hg abs. in the final stages are desirable. Alternatively an inert gas or a water-immiscible inert entraining agent, e.g. a highly purified hexane, can be used to assist in removing water, either at atmospheric or at a reduced pressure in conventional fashion. The solvent is removed from the esterification product by distillation when a batch is finished. The batch is conveniently deodorized by stripping it with steam for ½ hour to 3 hours at a lower pressure, e.g. 1–5 mm. Hg abs.

The lactated monoglyceride esterification product of our general production will be a mixture of glycerides and will contain some free fatty acid monoglyceride because: the fatty acid monoglyceride material most generally available and desirable is a mixture of two or more concentrated, preformed, distilled fatty acid monoglycerides; it will contain a few percent of corresponding diglycerides and can have an even smaller amount of corresponding triglycerides; the esterification reaction generally will not be complete, and even if it were, some rearranging of the fatty acid and lactic acid radicals is expected to yield (and this would be expected even when lactating absolutely pure monoglyceride compounds), a small proportion of monoglycerides, diglycerides, and possibly triglycerides of fatty acid, of lactic acid, and of the several possible combinations of lactic and fatty acid acyl residues at the various hydroxyl positions of glycerine.

However, as opposed to reacting together a mixture of lactic acid, one or more free fatty acids, and glycerine on the one hand in conventional manner, or a mixture of lactic acid and superglycerinated fat (which is material containing fatty acid mono- and diglycerides, both in substantial fraction, with a significant amount of fatty acid tri-glycerides also present) on the other hand, our esterification of lactic acid with the concentrated preformed monoglyceride (or mixed fatty acid monoglycerides) appears to give a manifestly different distribution of resulting glyceride materials for incorporation into a fluid shortening; and this, we have found, is shown in several ways, most significantly by the superior overall performance of the last-mentioned esterification product over the other two lactated materials in baked goods made from batters and doughs at comparative combined lactic acid levels, and only slightly less significantly by the pouring and other handling properties of the fluid shortening itself for practical use.

A further observation we have made is that optimum baking performance appears to correlate broadly with the presence of some fatty acid monoglyceride in its free state in our liquid shortening, i.e. at least about 2%, basis the lactated monoglyceride-providing composition, advantageously 5–35%, broadly 2–50%, and preferably for efficiency and economy, between about 10% and about 30%. By conventional analytical techniques only the free alpha monoglyceride is indicated, and the total free monoglyceride (alpha plus beta) is determined by multiplying the alpha assay value by a factor of 1.15.

Actually, in the preferred lower lactated monoglyceride compositions that we have made for our fluid shortening purposes, i.e. 0.4–1 mol of combined lactic acid per mol of starting fatty acid monoglyceride reactant, very little free fatty acid monoglyceride (e.g. about 2–5%) need be present to give quite a satisfactory (and superior to conventional shortenings) performance in the fluid shortening for baking functionally or for handling purposes, although much more can be tolerated, e.g. 35–50%. But as said combined lactic acid ratio rises, increasing the proportion in the free fatty acid monoglyceride present in the composition, even by dosing such lactated monoglyceride-providing composition with extraneous free fatty acid monoglyceride if it is not present in significant amounts in the esterification product as made, appears to be helpful. To avoid such dosing it is advantageous to limit the mol ratio of combined lactic acid to 1.6.

For example, at the higher combined lactic acid ratios of 1.6–1.8, such dosing is desirable to establish and maintain the superior creaming of batter and handling stability of the shortening product, and at the highest combined lactic ratios, e.g. above 1.8 up to about 2, such action is ordinarily necessary to supply and insure these desirable characteristics in the fluid shortening. Thus, it can be broadly stated that the especially advantageous lactated monoglyceride-providing compositions for our purposes are those which consist essentially of: about 2–50% of free monoglyceride of at least one $C_{14-22}$ fatty acid; and about 50–98% of the esterification product of lactic acid with at least one concentrated, preformed monoglyceride of at least one $C_{14-22}$ fatty acid and containing about 0.4–1.6 mols of combined lactic acid per mol of starting monoglyceride reactant.

Similarly, the preferred lactated monoglyceride-providing compositions are those wherein the free and lactated monoglycerides are $C_{16-22}$ fatty acid monoglycerides, the combined lactic acid of starting monoglyceride ratio is about 0.5–1, and there is in the composition about 5–35% of the free monoglyceride and about 65–95% of the esterification product. While the preferred lactated monoglycerides for our purposes have a melting point above 100° F. and are "normally solid glycerides" in the strict sense, they should not be confused with our unlactated normally solid (stearine) components in the shortening which also have similarly high melting points.

Suitable lactic acid for making our lactated monoglyceride is, of course, of food grade purity and has, e.g. 50–90% titratable acidity as lactic acid and preferably an 80% nominal titratable acidity. Such titration, of course, measures not only free lactic acid but some "polylactic acid or acids." Analysis of our lactated monoglyceride esterification product to find mols of combined lactic acid per mol of starting monoglyceride measures not only the combined monolactic acid mols, but also the combined polylactic acid mols equivalent to the monolactic acid (polylactic acid is, in reality, a lactide). Thus, for our lactated monoglyceride, a polylactic acid in combination with the fatty acid monoglyceride is included in the term "mols of combined lactic acid" as being equivalent to its corresponding number of monolactic acid radicals. When we speak of "combined mols of lactic acid per mol of starting monoglyceride reactant" the combined so-called polylactic acid or acids present are treated as their equivalent number of mols of monolactic acid.

The typical "80%" food grade lactic acid which we regularly employ for making our lactated monoglyceride-providing composition has the following permissible and average assays, composition (Q):

| | |
|---|---|
| Lactic and polylactic acids | 80% min. |
| Actual lactic acid and polylactic acids | About 81%. |
| Monolactic acid | 71.3%. |
| Iron as Fe | 10 p.p.m. max. (av. 2). |
| Arsenic as As | 1.4 p.p.m. max. (av. 0.2). |
| Heavy metals | Zero. |
| Ash | 0.07% max. (av. 0.017). |
| Sulfates as $SO_3$ | 40 p.p.m. max. (av. 20). |
| Chlorides as Cl | 16 p.p.m. max. (av. 4). |
| Color | Water white. |

The concentrated, preformed monoglyceride for use in the esterification reaction is one having at least about 85% of the $C_{14-22}$ fatty acid monoglyceride or mixture of such fatty acid monoglycerides. Advantageously we use a commercially available one with an alpha monoglyceride content of 90% minimum, and the total monoglycerides of $C_{14-22}$ fatty acids in its runs about 95% (alpha plus beta). It can vary in hardness from a soft pasty material to a hard chip or flake. A typical one, and the preferred one of our esterification reaction is in flake form, the distilled monoglyceride from (composition P) hydrogenated lard. Such monoglyceride has an iodine value below 2, a guaranteed minimum alpha monoglyceride content of 90%, and a total monoglyceride concentration (alpha plus beta) of about 95%, a Lovibond color of about 2 red and 10 yellow, a free fatty acid concentration of 0.6%, and a capillary melting point 154–156° F. The ratio of stearic to palmitic acid equivalent in it is about 74:26. This kind of monoglyceride was used in the preparation described in Example 1, below.

Processing machinery used in making our fluid shortening must be capable of generating minute crystals of solid material from a melt of the ingredients to the substantial exclusion of large crystals. This crystal generation by cooling, as well as the remainder of the processing steps, must be conducted under conditions precluding any substantial aeration as aeration imparts undesirable high viscosity and even stiffness to the resulting shortening. The most suitable cooling machine for our purposes is the "Votator" type chilling machine as described in detail hereinafter. Alternatively, a cooling machine capable of maintaining rapid heat transfer to the materials in process and scraping of the chilled surfaces can be used, e.g. a chilled "Stehling" tank wherein such apparatus is operated so as not to whip in air.

Conditions precluding substantial aeration of the materials in process include operating in liquid- or liquid and solid-filled apparatus without incidental air entrainment or injection; discarding or remelting the first runnings from empty apparatus which pick up air; in using vessels vented to atmosphere, avoiding substantial liquid turbulence and agitation devices that whip in air—in other words, adopting conventional agitators such as paddles and blades that by their configuration and their projection from the surface of the mixture, if any, maintain the material in an agitated state without vortexing, splashing, or such surface turbulence as is apt to beat in air; and, when filling containers with the product, avoiding splashing, spraying or otherwise air entraining operations, e.g. maintaining the kinetic energy of the filling stream quite low so that when it strikes a solid or liquid surface, air is not entrained. Bottom filling devices for containers are generally quite suitable. The use of a superatmospheric pressure in the fluid process apparatus is also helpful for preventing air leaks into the shortening, and the avoidance of gas-forming refrigerants such as solid carbon dioxide is dictated. As little as 5 volume percent of gas in our shortening stiffens it substantially.

At the start of the process the normally solid glycerides, the liquid glyceride vehicle, the lactated monoglyceride-providing composition are mixed together and melted until a clear homogeneous mass results. Preferably the melting temperature is about 140-150° F. but lower temperatures can be used so long as the melt formed is clear; higher melt temperatures also can be used so long as they do not harm the fats in process. Higher temperatures, however, merely require greater cooling for no specially advantageous result. The melt is then quickly cooled, ordinarily in less than 5 minutes and preferably in about 2 minutes or less. The rapid cooling provides minute crystal formation and prevents the graining out of large crystals. Where the cooling load in heavy production is substantial on the "Votator" or other cooling machine, an indirect water precooler before the "Votator," rapidly lowering the temperature of the melt from about 150° F. to about 125-135° F. is sometimes advantageous to reduce the refrigeration load on such machine.

In the cooling machine the material must be cooled low enough so that it will generate a slurry or magma of fine crystals, either inside the cooling machine or thereafter from subcooling of the melt inside the machine. Broadly, the cooling should be below about 100° F., more advantageously below about 95° F., and preferably between about 85° and about 90° F. for efficiency and economy in the operation. However, temperatures as low as about 50° F. or even lower can be used in this cooling step, the cooling to such extremely low temperatures being limited principally by the fact that the material in process becomes thick and hard or jelly-like and is necessarily harder to handle in this condition.

From the cooling apparatus the flow of material is advantageously agitated in a "Votator B" or similar agitated holding vessel to allow crystallization to develop and to remove supercooling effects. Some of the solid material in process at this stage is in an unstable crystal form and is liable to change to a more stable crystal form on standing. Accordingly, the magma is tempered in an agitated tempering zone, e.g. a mildly agitated tank, until the crystals present assume a condition that is stable below about 100° F. and generally between 90° and 100° F.

While the heat of crystallization of the magma can raise the temperature several degrees Fahrenheit, to insure the formation of the stable crystals in the most rapid time we heat the magma to a temperature between 90° and 100° F. and preferably between 90° and 95° F. while agitating it for at least about one-half hour, and preferably 2 to 20 hours. Even longer tempering periods can be used and frequently the magma is left at temperatures 90-95° F. conveniently for one or two 8-hour working shift periods to accommodate personnel in the plant. Where longer times are convenient, it is possible also to temper for extended periods at lower temperatures, e.g. room temperature of 65-80° F. There appears to be no critical upper limit on tempering time.

Prior to packaging we have found it convenient to cool the tempered magma to 75-85° F. with indirect water cooling. This is not strictly necessary although it establishes a desirable uniformity of processing technique. The form of stable crystal in our resulting fluid shortening can be mainly beta in some instances, and mainly beta prime in others, the stable form of the crystal apparently being attributable to the sort of stearine we have used, a predominance of the beta crystal form usually giving a somewhat less viscous product than a predominance of the beta prime crystal form.

The packaging of the shortening preferably is done in plastic-lined 55-gallon steel drums, tin-lined 5-gallon cans, or large stainless steel tanks for tank wagon delivery. For maintaining the pristine form of the liquid shortening it is best stored within a narrow temperature range, e.g. 60-90° F. and even more suitably 60-80° F. Should the product be cooled substantially below 60° F. and stiffens or solidifies, it can be warmed back to the 60-90° F. temperature range without impairment of its handling or functional properties. However, should the shortening be heated so high that melting of the solid fraction suspended in the vehicle occurs virtually completely, e.g. to a temperature substantially above 100° F., the product should be reprocessed in the manner we have described to insure that the desirable handling properties are preserved and gelation or plasticization are avoided.

Acceptable antioxidants and sequestrants can be incorporated in our fluid shortening, suitably in the melting stage or the tempering stage of the process, in acceptable quantities. Thus, for example, citric acid can be used as a sequestrant, and the following anti-oxidants can be employed: butylated hydroxyanisole, up to 0.02%; butylated hydroxytoluene, up to 0.02%; propyl gallate, up to 0.02%; and nordihydroguaiaretic acid, up to 0.02%. The presence of these minute amounts of materials do not affect its functional baking properties or handling properties, and their use is optional.

Criteria for cakes include: texture, a good cake having fine cell walls and multiplicity of fine bubbles; a smooth top not blotched or cratered; an even color in the interior and over the exterior (although the exterior color may be somewhat different from the interior color) with no dark "sugar rings" apparent on the top surface; neither gummy sensation when masticated, nor sensation of dryness; tenderness to cutting and chewing without "overtenderness" which makes a cake fall apart on cutting; no substantial dip in the top center nor too great a peak in the top center which requires trimming to assemble in layers and which tends to draw the normally vertical sidewall of the cake down too low (actually, a reasonably flat top on the cake is preferred for assembling into layers); and a reasonable shelf-life of several days and preferably a week or longer before staleness requires its removal from sale. From our experience it appears that the oil vehicle serves greatly in imparting the last characteristic when properly dispersed in a shortening, and that our lactated monoglyceride-providing composition is fundamental in achieving the good dispersion.

Various cake and dough recipes wherein our improved fluid shortening have been used and wherein conventional shortenings have been used for comparative purposes are set forth below. The percentages listed are in the conventional bakery practice of being based upon total flour as 100% and all other ingredients relative thereto unless otherwise specifically noted. In the general instance more than one mixing "stage" is used to make the batter or dough. The ingredients for each particular stage are listed together and followed by a direction for treating that particular stage before going on to the next. It should be noted especially while many of the recipes are given for batters compounded in three or more stages, with our improved fluid shortening ordinarily two mixing or blending stages can be combined in a single stage without any detraction whatsoever from the resulting cake performance. This, of course, is an economical technique in baking practice, and it is not possible with many conventional shortenings. In the recipes given the eggs or egg fractions used are not and needed not be beaten or whipped before incorporation, although this can be done if desired. The excellent performance of our shortening renders such step unnecessary, even in "foam-type" batters such as for chiffon and hot milk sponge cakes.

The flour used in all the recipes given is a white wheat flour prepared by grinding and bolting clean wheat. It is of high uniform quality for reproduceability of results. It can be sifted if desired, but need not be and is sifted only when expressly indicated in the recipes below. The baking powder used is a conventional one containing sodium bicarbonate and an acid component such as tartaric acid, sodium acid pyrosphophate, or the like. (Unless otherwise indicated the baking powder used in test procedure appearing hereinafter was "Fleischman's" brand to impart uniformity to the testing procedures. Baking time for an 8 oz. layer cake generally will be 20–25 minutes at about 365° F., e.g. 23 minutes, unless otherwise expressly indicated. Larger cakes, of course, require longer baking times.

It should be recognized that ordinarily white granulated sugar (sucrose) or aqueous sucrose sirups are the preferred sweetenings necessary to many recipes. However, in some recipes brown sugar is called for, and in others some or all of the sucrose can be replaced with invert sugars, e.g. dextrose or fructose, corn sirup, etc., and even artificial sweeteners such as saccharine can be used to replace sucrose.

A. WHITE LAYER CAKE TEST—140% SUGAR

| | | |
|---|---|---|
| Flour, 62.5% | oz | 12.5 |
| Shortening, 50% | oz | 10 |

Cream for two minutes at low speed, scrape bowl, then add:

| | | |
|---|---|---|
| Granulated sugar, 140% | oz | 28 |
| Nonfat dry milk solids, 12.5% | oz | 2.5 |
| Salt (NaCl), 1.25% | oz | 0.75 |
| Baking powder, 0.625% | grams | 35.5 |
| Water, 50% | oz | 10 |

Cream for two minutes at low speed, scrape bowl, then add:

| | | |
|---|---|---|
| Egg whites, 80.0% | oz | 16 |

Cream for two minutes at low speed, scrape bowl, then add:

| | | |
|---|---|---|
| Water, 37.5% | oz | 7.5 |
| Vanilla, 0.125% | oz | 0.25 |

Cream for four minutes at low speed. Measure 14 oz. of batter per 8″ circular layer pan. Bake 20 minutes at 365° F. in oven.

B. HOUSEHOLD TYPE CAKE TEST USING CONVENTIONAL HOUSEHOLD ELECTRIC MIXER—132% SUGAR

| | | |
|---|---|---|
| Cake flour, 100.0% | oz | 7.75 |
| Granulated sugar, 132.0% | oz | 10.25 |
| Shortening, 45.0% | oz | 3.5 |
| Baking powder, 6.45% | oz | 0.5 |
| Salt, 3.22% | oz | 0.25 |
| Liquid whole milk, 71% | oz | 5.5 |

Mix two minutes at moderate speed, scrape well with rubber scraper, then add:

| | | |
|---|---|---|
| Liquid whole milk, 39.0% | oz | 3 |
| Egg whites, 58.00% | oz | 4.5 |
| Vanilla, 3.22% | oz | 0.25 |

Add remainder of milk and egg whites and mix at moderate speed for two minutes. Pour 15 ounces of batter in each of two 8″ circular cake pans. Bake 22 minutes at 365° F.

C. WHITE POUND CAKE—125% SUGAR

| | | |
|---|---|---|
| Shortening, 60.0% | lbs | 3 |
| Cake flour, 100.0% | lbs | 5 |
| Granulated sugar, 125.0% | | 6 lbs., 4 oz. |
| Dry skim milk powder, 10.0% | oz | 8 |
| Salt, 3.0% | oz | 2.5 |
| Baking powder, 2.5% | oz | 2.0 |
| Water, 45.0% | | 2 lbs., 4.0 oz. |

Blend for four minutes at medium speed, then add slowly:

| | | |
|---|---|---|
| Egg whites, 70.0% | | 3 lbs., 8 oz. |

Mix three minutes at low speed, then add slowly:

| | | |
|---|---|---|
| Water, 10.0% | oz | 8 |
| Vanilla, 3.0% | oz | 2.5 |

Bake at 360° F. A four pound twelve-ounce slab requires about 1.75 hours of baking.

PRODUCTION POUND CAKE—109% SUGAR

| | | |
|---|---|---|
| Shortening | percent | 44 |
| Cake flour | do | 100 |
| Granulated sugar | do | 109 |
| Skim milk powder | do | 12.8 |
| Salt | do | 1.6 |
| Sodium bicarbonate (baking soda) | do | 0.34 |
| Sodium acid pyrophosphate (V–90) | do | 0.5 |
| Mace | do | 0.09 |

Mix as in cake (C) above, then add slowly:

| | | |
|---|---|---|
| Whole eggs | percent | 48.5 |

Mix as for cake (C) above, then add:

| | | |
|---|---|---|
| Water | percent | 74.5 |
| Butter flavor | do | 0.23 |
| Vanilla | do | 0.46 |
| Protein food color, "Amprol" brand | do | 1.30 |

Mix as directed for cake (C) above, then bake at 365° F.

E. DEVIL'S FOOD LAYER CAKE—140% SUGAR

| | | |
|---|---|---|
| Shortening, 60% | lbs | 3 |
| Cake flour, 100% | lbs | 5 |
| Granulated sugar, 140% | lbs | 7 |
| Cocoa, 20% | lbs | 1 |
| Baking powder, 4.5% | oz | 3.5 |
| Baking soda, 1.5% | oz | 1.25 |
| Salt, 3.0% | oz | 2.50 |
| Nonfat dry milk powder, 12.0% | oz | 9.5 |
| Water, 60.0% | lbs | 3 |

Blend for four minutes at low speed, then add slowly:

| | | |
|---|---|---|
| Egg whites, 20% | lbs | 1 |
| Whole eggs, 60% | lbs | 3 |

Mix for three minutes at low speed, then add slowly:

| | | |
|---|---|---|
| Water, 55% | | 2 lbs, 12 oz. |
| Vanilla, 3% | oz | 2.5 |

Mix for four minutes at low speed. Scale 14 ounces per 8″ greased layer cake pan. Bake at 365° F.

F. YELLOW POUND CAKE—120% SUGAR

| | | |
|---|---|---|
| Shortening, 65% | | 3 lbs., 4 oz. |
| Cake flour, 100% | lbs | 5 |
| Granulated sugar, 120% | lbs | 6 |
| Salt, 3% | oz | 2.5 |
| Baking powder, 1.25% | oz | 1.0 |
| Nonfat dry milk powder, 10.00% | oz | 8.0 |
| Mace, 0.25% | oz | 0.25 |
| Water, 45.00% | | 2 lbs, 4.00 oz. |

Blend for four minutes at medium speed, then add:

| | | |
|---|---|---|
| Whole eggs, 70.0% | | 3 lbs., 8 oz. |

Mix for three minutes at low speed, then add:

| | | |
|---|---|---|
| Water, 10.0% | oz | 8 |
| Lemon flavor, 2.0% | oz | 1.5 |
| Vanilla, 3.0% | oz | 2.5 |

Mix for four minutes at low speed. Bake at 350° F.

G. REGULAR YELLOW LAYER CAKE—120% SUGAR

| | | |
|---|---|---|
| Shortening, 45% | 2 lbs., | 4 oz. |
| Cake flour, 100 | lbs | 5 |
| Granulated sugar, 120% | lbs | 6 |
| Nonfat dry milk powder, 10% | oz | 8 |
| Salt, 3% | oz | 2.50 |
| Baking powder, 6% | oz | 4.75 |
| Water, 45% | 2 lbs., | 4.00 oz. |

Blend for four minutes at low speed, then add slowly:

Whole eggs, 50% ---------------- 2 lbs., 8 oz.

Mix for three minutes at low speed, then add slowly:

| | | |
|---|---|---|
| Water, 45% | 2 lbs., | 4 oz. |
| Vanilla, 3% | oz | 2.5 |

Mix for four minutes at low speed. Scale 13 ounces per 8″ layer pan. Bake at 360° F.

H. BANANA CAKE—140% SUGAR

| | | |
|---|---|---|
| Shortening, 40% | lbs | 2 |
| Cake flour, 100% | lbs | 5 |
| Granulated sugar, 140% | lbs | 7 |
| Nonfat dry milk powder, 12% | oz | 9.5 |
| Salt, 3% | oz | 2.5 |
| Baking powder, 6% | oz | 4.75 |
| Ripe bananas, 80% | lbs | 4 |
| Water, 30% | 1 lb., | 8.00 oz. |

Blend for four minutes at a low speed, then add slowly:

Whole eggs, 70% ---------------- 3 lbs., 8 oz.

Mix three minutes at low speed, then add slowly:

Water, 20% ----------------lbs-- 1

Mix four minutes at low speed. Scale 13 ounces per 8″ layer pan. Bake at 360° F.

I. RICH WHITE LAYER CAKE—140% SUGAR

| | | |
|---|---|---|
| Shortening, 55% | 2 lbs., | 12 oz. |
| Cake flour, 100% | lbs | 5 |
| Granulated sugar, 140% | lbs | 7 |
| Nonfat dry milk powder, 11.75% | oz | 9.5 |
| Salt, 3.75% | oz | 3.0 |
| Baking powder, 6.25% | oz | 5.0 |
| Water, 50.00% | 2 lbs., | 8.0 oz. |

Blend for four minutes at low speed, then add slowly:

Egg whites, 75.0% ---------------- 3 lbs., 12 oz.

Mix for three minutes at low speed and then add slowly:

| | | |
|---|---|---|
| Water, 33.0% | 1 lb., | 5 oz. |
| Vanilla, 3.75% | oz | 3 |

Scale 14 ounces of batter per 8″ layer pan and bake at 360° F.

The foregoing recipe is also suitable for cup cakes and can be stiffened by the addition of ¼–½ ounce of flour per 1 pound of batter, if desired.

I′. REGULAR WHITE LAYER CAKE—120% SUGAR

| | | |
|---|---|---|
| Shortening, 45% | 2 lbs., | 4 oz. |
| Cake flour, 100% | lbs | 5 |
| Granulated sugar, 120% | lbs | 6 |
| Nonfat dry milk powder, 10% | oz | 8 |
| Salt, 3% | oz | 2.5 |
| Baking powder, 6.25% | oz | 5.0 |
| Water, 50% | 2 lbs., | 8.0 oz. |

Blend for four minutes at low speed, then add slowly:

Egg whites, 65% ---------------- 3 lbs., 4 oz.

Mix three minutes at low speed, then add:

| | | |
|---|---|---|
| Water, 25% | 1 lb., | 4 oz. |
| Vanilla, 3% | oz | 2.5 |

Mix for four minutes at low speed. Scale 14 ounces of batter per 8″ layer pan. Bake at 360° F.

This batter can also be used for cup cakes and can be stiffened in the manner of recipe (I) above.

The foregoing three-stage recipes generally can be converted into two stage operations by mixing all the ingredients except the egg (or egg fractions) used and about one-half to one-third of the liquid substances (whole milk and/or water). This reserved milk and/or water and the egg material is added as a second step after the first stage is mixed for approximately four minutes. The second stage is mixed from two to four minutes and generally for about three minutes.

K. A TYPICAL SWEET DOUGH TEST FORMULA FOR COFFEE CAKE OR BREAD-LIKE PRODUCTS

A dry mix is prepared from 100% flour, 10% sugar, 2% salt, and 4% nonfat dry milk powder. Wet ingredients to be added subsequently are: 4 ounces of yeast, 6% whole eggs, 66% water, 4–8% shortening. The dough is made by mixing 58 ounces of the dry mixture with 3 ounces of eggs, 33 ounces of water, 2 ounces of yeast, and 2–4 ounces of shortening. The dough is mixed for 10 minutes and scaled into one-ounce buns for baking.

K′. CHOCOLATE CAKE

A chocolate cake recipe using conventional peanut oil for the shortening ingredient is given as follows:

| | | |
|---|---|---|
| Sifted flour | cups | 2.5 |
| Sugar | do | 0.75 |
| Baking powder | teaspoons | 2 |
| Salt | do | ½ |

Beat for three minutes, then add:

| | | |
|---|---|---|
| Whole eggs | | 2 |
| Sugar | cups | 0.75 |

Gradually beat in the eggs and the sugar about two minutes, then add:

| | | |
|---|---|---|
| Melted baking chocolate | oz | 4 |
| Milk | cups | 1 |
| Peanut oil | do | ½ |
| Vanilla | teaspoons | 1 |

Beat for one minute and bake at 375° F.

The following two recipes are for two-stage high ratio "bakery" cakes employing fluid shortening.

L. YELLOW CAKE

| | | |
|---|---|---|
| Cake flour, 100% | lbs | 5 |
| Fluid shortening, 55% | 2 lbs., | 12 oz. |
| Sugar, 140% | lbs | 7 |
| Salt, 3.75% | oz | 3 |
| Baking powder, 6.25% | oz | 5 |
| Water, 40.00% | lbs | 2 |
| Nonfat dry milk powder, 10.00% | oz | 8 |

Mix in 80-quart batter mixer, e.g. a "Century" mixer, for three minutes, then add:

| | | |
|---|---|---|
| Whole eggs, 60% | lbs | 3 |
| Water, 60% | lbs | 3 |
| Vanilla | oz | 1–2 |

Mix for three minutes and bake in cake pans at 365° F.

M. DEVIL'S FOOD CAKE

| | | |
|---|---|---|
| Cake flour, 100% | lbs | 4 |
| Granulated sugar, 168% | 6 lbs., | 12 oz. |
| Cocoa, 20% | oz | 13 |
| Baking powder, 4% | oz | 2.5 |
| Baking soda, 3% | oz | 2.0 |
| Salt, 4% | oz | 2.5 |
| Fluid shortening, 50% | lbs | 2 |
| Whole milk, 69% | 2 lbs., | 12.0 oz. |
| Vanilla, .5% | oz | 1.0 |

Mix in 30-quart batter mixer, e.g. a "Hobart" mixer, for three minutes, then add:

Whole milk, 69% _____ 2 lbs., 12 oz.
Whole eggs, 69% _____ 2 lbs., 12 oz.

Mix for three minutes then bake at 365° F. in layer cake pans.

N. WHITE CAKE MIX

A typical formula for a pre-package white cake mix is as follows. (Percentages here given are on the total mixture rather than on the flour weight.)

Granulated sugar _____ percent___ 43.9
Cake flour _____ do____ 39.0
Salt _____ do____ 1.0
Nonfat dry milk solids _____ do____ 2.0
Sodium bicarbonate _____ do____ 0.45
Sodium acid pyrophosphate _____ do____ 0.35
Monocalcium phosphate _____ do____ 0.30

Mix together five minutes, sift, mix two minutes more, then add:

Fluid shortening _____ percent___ 13.0

Using a wire whip, mix one minute at a low speed, scrape down, then mix two minutes at a high speed.

O. A cake batter made from such mix is as follows:

White cake mix _____ grams___ 567
Water _____ do____ 120
Egg whites _____ do____ 35

Mix two minutes at medium speed. Bake at 365° F. for approximately 23 minutes.

In the foregoing and similar pre-packaged mixes the water, egg, and fluid shortening can be added, if desired to the dry ingredients in a single stage instead of two stages.

Accordingly, in such instances it can be advantageous to make a packaged assembly of the mixed dry materials (flour, sugar, salt, milk powder, etc.) as one discrete unit and a flexibly-pouched or rigidly-bottled, measured quantity of our fluid shortening as another discrete unit. Maintenance of this fat separate from the dry ingredients imparts prolonged shelf-life to the assembly, and it provides a convenient way to make a cake simply and rapidly.

O'. PIE DOUGH FOR CRUSTS

Pastry flour _____ lbs__ 2
Liquid shortening _____ lbs__ 1
Dry corn sugar ("Cerelose") _____ oz__ 1
Salt _____ oz__ ½
Ice water _____ oz__ 9

Mix 0.5 minute; form into pie crust.

The following examples show several ways in which our invention has been carried out, but are not to be construed as limiting the invention. Unless otherwise specifically expressed all percentages are by weight, all temperatures are in degrees Fahrenheit, and all melting points are Wiley melting points.

Example 1

There was charged into a stainless steel agitated kettle 14,900 lbs. of distilled fatty acid monoglyceride having composition (P), above; 4410 lbs. of food grade 80% lactic acid of composition (Q), above; and ½% of water based on the combined weights of the monoglyceride composition and the lactic acid. Nitrogen was bubbled through the reaction mixture to provide an inert atmosphere in the system.

The reactor was heated with steam coils to 250° F., then raised in five hours to 300° F., while at atmospheric pressure, whereby water was distilled off gradually. When the acid number of the batch was 61.5, the pressure on the kettle was reduced to 0.4 mm. of Hg abs., and the batch temperature was raised from 300° F. to 360° F. in a period of five hours while sparging open steam into reaction mass. This operation continued for an additional 1.25 hours at a temperature of 350° F. Then the batch was cooled in a 1.75-hour period. The resulting lactated monoglyceride esterification product weighed 15,360 lbs. It contained 12% of combined lactic acid, this amounting to 0.523 mol of combined lactic acid per mol starting monoglyceride reactant. Other characteristics of the product were as follows: Acid No. 8.1; alpha monoglycerides of fatty acids assay 14.7%; Sap. No. 237; Hydroxyl No. 182.6. The product was formed into waxy solid flakes using conventional equipment, and it remained solid at room temperature and at temperatures exceeding 100° F.

Example 2

The tabular summary below describes the reaction procedure and product characteristics for four bench scale esterifications of food grade 80% lactic acid composition (Q), above, with concentrated distilled monoglyceride of fatty acid composition (P), above. In the first run the batch was finished under an absolute pressure of 100–50 mm. of Hg abs. pressure; in the second and third runs, the finishing pressure required was about 5 mm. Hg abs., and in the fourth run a finishing absolute pressure below 5 mm. Hg abs. was used. The initial water distillation in the runs commenced at atmospheric pressure. Each batch was deodorized by steaming the crude esterification product for 1–1.5 hours at an absolute pressure between 1 and 5 mm. Hg.

| Run No. | 1 | 2 | 3 | 4 |
| --- | --- | --- | --- | --- |
| Reaction Temp., °F | 400 | 350 | 300 | 250 |
| Reaction Time, Hr | 1 | 1.25 | 2.5 | 4.0 |
| Condensate Collected, cc | 43 | 43.00 | 38.0 | 37.0 |
| Acid No. Before Deodorizing | 2.6 | 5.6 | 11.0 | 8.0 |
| Deodorization Loss, wt. percent | 0.6 | 0.9 | 4.0 | 4.0 |
| Analysis: | | | | |
| Acid No. After Deodorizing | 4.8 | 6.2 | 8.1 | 4.8 |
| Sap No | 263.5 | 260.5 | 255.0 | 251.0 |
| Free Alpha Fatty Acid Monoglycerides, wt. percent | 14.8 | 16.2 | 19.1 | 22.6 |
| Hydroxyl No | 242.3 | 243.7 | 245.6 | 254.6 |

The mols of combined lactic acid per mol of starting monoglyceride reactant was approximately 9/10:1 for each of these runs. The products were waxy solids capable of being flaked and having melting points above 100° F. Randomization (with respect to the distribution of acyl groups, i.e. fatty acid and lactic acid radicals) did not appear to have occurred to any great degree during the esterification at any of the foregoing reaction temperatures.

By incorporating a greater proportion of lactic acid relative to the monoglyceride reactant in the foregoing procedure the mol ratio of combined lactic acid can be made to rise to higher value, e.g. 1.4, 1.6, 1.8, and approaching 2. In other laboratory esterifications made in a similar manner to those tabulated above, the free total monoglyceride content of the resulting product was as high as about 35%.

A dozen cake batters were made with recipe "N" above, incorporating therein fluid shortenings containing 4%, 6%, and 8%, respectively, of the foregoing tabulated lactated monoglyceride-providing compositions. The densities of the various batters made ranged from 0.67 to 0.73, i.e. desirably light and high grade for this type of cake. The ensuing baking tests confirmed this.

In further tests similar batters were made using the foregoing tabulated products made at 400° F. and at 250° F., except that they had a 6% level of these esterification products (basis the fluid shortening used) and additionally had added thereto 2% (basis shortening) of free monoglycerides of fatty acids (composition "P"), above. The resulting batter density wherein the 400° F. esterification product was used declined favorably from 0.71 to 0.65, but, in the batter made with the esterification product at 250° F., the cake batter density was 0.69 and was the same as that made without the deliberate addition of free fatty acid monoglyceride.

In four still further tests at a 4% level (basis shortening) of lactated monoglyceride-providing compositions made at the four temperatures above, except that an additional 4%, basis shortening, of superglycerinated animal-derived fat (approximately 40% monoglycerides of fatty acids, and 50% diglycerides of fatty acids, and 10% of triglycerides of fatty acids, the fatty acids being predominantly palmitic and stearic, basis superglycerinated fat) was incorporated in the shortening. The resulting batter densities were virtually unchanged.

*Example 3*

The following is a description of preparing our preferred fluid shortening. The initial chilling apparatus was a "Votator A" unit chilling machine followed by a "Votator B" unit. Such chilling unit is described in U.S. Reissue Patent 21,406 and U.S. Patent 1,783,864. In this type of chiller, a liquid is passed into an externally-refrigerated, elongated cylinder. Crystals which form are continuously scraped from the cylinder walls. The "B" unit used was an elongated cylindrical chamber in series with the "A" unit and having a rotating shaft set with projecting fingers intermeshing with stationary fingers projecting from the inner wall to provide agitation while crystal formation and modification occur under virtually adiabatic conditions. Inlets and outlets of the units were at their bases. The units were made mainly of steel, with some austenitic stainless steel trim. The "A" unit was cooled by direct expansion ammonia in the jacket.

A mixture of 1% cottonseed stearine hydrogenated to below 5 I.V., 6% of the lactated monoglyceride-providing composition made as described in Example 1, and 93% of refined, bleached soybean oil, which had been deodorized by steam stripping under vacuum, was made in an iron tank and warmed to 150° F.±5° with agitation. The resulting clear melt was run at the rate of about 533 lbs. per hour into the "A" unit of the "Votator" continuously and withdrawn continuously at a temperature 87° F. from the "B" unit, the temperature rise from the inlet to outlet of "B" unit being very small, e.g. not more than a few degrees Fahrenheit.

The continuous discharge from the "B" unit was fed into a steel storage tank that was mildly agitated, and temperature was maintained at about that of the Votator "B" unit discharge for about 16 hours. Then, under continuous mild agitation, the temperature was raised to 94°±1° F. in about one-half hour and the mixture held at this temperature for about 3 hours. Finally, the mixture, thus tempered, was withdrawn from storage tank, cooled to 80° F., and then run into a drum.

In the votating, the transfer of fluids thereafter, the storage, and the packaging operations conditions were maintained to preclude any substantial aeration of the material. Thus, the productions steps of the operation from the "Votator" feed through the final cooling step were maintained in apparatus filled with liquid or magma, and the first runnings of the liquid or magma through empty apparatus was discarded from process to eliminate material that had entrained or otherwise picked up gases. Agitation in the storage tank, which was open to atmosphere at the top, was sufficiently mild so that the surface of the magma therein was unturbulent; the agitation was done by blades that extended from a central shaft and operated against no baffles. By the blade configuration, disposition, and speed the agitation was unable to whip in air to any appreciable extent or to form a vortex. The filling into the drum was done carefully without splashing, spraying, or permitting the filling stream to entrain much air into the rising container contents.

The rapid cooling and agitation of the melt in the "Votator" formed a thin magma of extremely fine glyceride crystals (which were apparent as a cloud when the material was admitted to the storage tank). The final product was a thicker opaque material, readily pourable in the temperature range of from 60–90° F. by gravity from a container, and when maintained in this temperature range for a period of weeks, the original pourable characteristics were preserved without noticeable impairment.

A similar run to that of Example 3 was made using, instead of cottonseed stearine as the normally solid glyceride, 1% of a tallow stearine. The product was essentially the same as that of Example 3.

Another run was made in the manner of Example 3, except that no final cooling was used, and the tempered magma was discharged from the storage tank at about 95° F. directly into a drum. The resulting product was slightly more viscous than the product made as shown in Example 3. This slight increase in the viscosity was attributable to a more rapid filling of the container whereby a little more air appeared to have been entrained.

It is important to note here that absolute preclusion of air is extremely difficult because of the extreme ability of our liquid shortening to entrap air, but that handling of the product to keep air (or other gas) entrainment a minimum consistent with practical manufacturing procedure is adequate to give a product readily pourable in the temperature range of 60–90° F. Even then, when using such precautions, one is able to place a sample of our fluid shortening in a high vacuum chamber and observe considerable foaming as air escapes from the sample.

*Example 4*

In further runs made essentially in the manner of Example 3, except that 2% of cottonseed stearine hydrogenated to an I.V. below 5 was used, the resulting product had an observably higher viscosity, but nevertheless was pourable by gravity in the temperature range of 60–90° F.

*Example 5*

In still further operations done in the manner of Example 3, a refined cottonseed oil was used as the liquid vehicle for making the melt. Along with this in 1 instance 2% of a cottonseed stearine hydrogenated to 15 I.V. was used as the normally solid glyceride, and in another instance 2% of a cottonseed stearine hydrogenated to 0.54 I.V. was used. The fluid shortening in both these operations was made using 92% of said cottonseed oil vehicle and 6% of the lactated monoglyceride-providing composition made as described in Example 1. The fluidized shortening made with the lower I.V. stearine showed crystals by X-ray diffraction mainly in a beta configuration, and fluid shortening made from the higher I.V. stearine showed crystals mainly in a beta prime configuration. Both products were pourable by gravity in the temperature range 60–90° F., the latter being somewhat more viscous than the former.

*Example 6*

Fluid shortenings made in the manner of Example 3 using 1% stearine in one case and 2% stearine in the other as the normally solid glyceride were tested at various temperatures for change in solids content by dilatometry. The average percent solids based on weight of liquid shortening is tabulated in column R, and an average percent solid material relative to the total crystalline material charged into the particular batch of fluid shortening (these solids being the stearine and lactated monoglyceride-providing composition) is tabulated in column S, the average being determined by plurality of test readings.

These results show the quite widely fluctuating solids content of our fluid shortening in the temperature range of 60–90° F. Solids content for the 1% stearine-containing fluid shortening increases by about 216% when going from 90° to 60° F. The increase for the other is about 142%.

| Temp., °F. | Fluid Shortening with 1% Stearine | | Fluid Shortening with 2% Stearine | |
|---|---|---|---|---|
| | R | S | R | S |
| 60 | 3.10 | 44.2 | 4.50 | 56.2 |
| 70 | 2.95 | 42.1 | 4.17 | 52.0 |
| 80 | 2.37 | 33.9 | 3.49 | 43.7 |
| 90 | 0.98 | 14.0 | 2.08 | 26.0 |

The following examples are of test bakings. Unless otherwise expressly indicated, the products were of excellent quality for their types.

*Example 7*

A two-stage commercial bakery batch of high ratio yellow cake was made using recipe "L" above, with our fluid shortening produced in the manner of Example 3. The resulting cake was of superior quality according to all cake criteria.

A two-stage commercial batch of high ratio devil's food batter was made using recipe "M" above, with our fluid shortening produced in the manner of Example 3. The resulting cake was of superior quality by all cake criteria.

Two-stage Test White Layer Cake, recipe "I" above, was made using our fluid shortening produced in the manner of Example 3. The specific gravity of the batter was 0.820. It was smooth and glossy. The resulting cake had 1350 cc. per pound volume and was very fine and even. Identical cakes made with similar shortening, except that the shortening had no normally solid unlactated triglycerides in it gave similarly excellent results but slightly less volume (1310 cc. per pound).

In the foregoing and subsequent preparations the batter specific gravities were measured at room temperature (about 70° F.) unless otherwise indicated.

*Example 8*

White household cake was made with recipe "B," above, using our fluid shortening as produced by the method of Example 3, except that the normally glyceride vehicle was a refined cottonseed oil instead of soybean oil. The specific gravity of the batter was 0.83. The resulting cake volume was 1360 cc. per pound. The cake had a very nice, slightly raised top and fine, even, feathery texture.

*Example 9*

Test cakes were made according to recipe "B" above, using in the first instance our fluid shortening containing 6% of the lactated monoglyceride-providing composition made in accordance with Example 1 (basis shortening), 2% of a 0.5 I.V. cottonseed stearine, and 92% refined cottonseed oil, and, in the second instance, the same kind of fluid shortening except that cottonseed stearine used had a 15 I.V. Specific gravity of the first batter was 0.808, and the first cake volume 1335 cc. per pound. The specific gravity of the second batter was 0.810, and the cake volume was 1360 cc. per pound. Both batters yield cakes of fine, even, feathery texture with excellent tops.

*Example 10*

The following are presented to show the effects of using the various other pourable shortenings in cakes in contrast to our present liquid shortening. In the first four instances the recipes used were for white cakes "B" above.

In the first cake test preparation, the pourable shortening used was a suspension in winterized, refined cottonseed oil of 2% distilled monoglycerides from cottonseed stearine (assaying above 90% fatty acid monoglycerides mainly of $C_{16}$–$C_{18}$ fatty acids), and 5% of the conventional lactated reaction product of lactic acid, free fatty acids (predominately palmitic and stearic), and glycerine in equimolar ratios.

In the first test, the specific gravity of the cake batter was 0.905, the cake volume was 1280 cc. per pound, and the resulting cake had coarse and irregular texture.

In the second cake test preparation the pourable shortening used was 2% of a superglycerinated fat made from soybean oil, and 5% of the same kind of conventional lactated reaction product of fatty acids and glycerine suspended in refined winterized cottonseed oil. About 0.4 of the superglycerinated fat was the monoglycerides of predominately palmitic and stearic acid, and the balance of it was di- and triglycerides.

In the second test the batter was smooth and slick. It had specific gravity of 0.863. The resulting cake had a volume 1280 cc. per pound. The top of the cake made with this shortening had a slight dip, and the texture was coarse and irregular.

In the third cake test preparation, the pourable shortening used was a widely marketed variety. It contained 4.6% solids at 70° F. suspended in a high grade liquid salad oil, the solids being a mixture of mono-, di- and triglycerides.

In the third test, the cake batter showed very little aeration as it had a specific gravity of 1.095. The resulting cake had 1290 cc. per pound volume, a slight tendency to dip on the top, and the texture was coarse and irregular.

In the fourth cake test preparation, the pourable shortening used was 10% of the aforesaid conventional lactated reaction product of fatty acids and glycerine suspended in refined winterized cottonseed oil. The shortening so compounded was difficult to maintain in pourable suspension and tended to separate.

In the fourth test, the specific gravity of the batter was 0.846; it was smooth and glossy. The cake volume was 1375 cc. per pound. It showed a slight dip on the top and the texture was coarse and uneven.

In the fifth cake test preparation the shortening was refined, winterized cottonseed oil plus 3%, basis flour used, of a water emulsion of conventional sorbitol monostearate and sorbitol polyoxy monostearate sold for baking purposes. The water emulsion itself was 0.65 water, 0.28 sorbitol monostearate, 0.07 sorbitol polyoxy monostearate.

In the fifth test, the white cake attempted was unsatisfactory and virtually in all respects. The same unsatisfactory results were experienced when such shortening was compounded into conventional chocolate cake batters, but satisfactory yellow cake could be made from conventional recipes using this shortening.

In the sixth cake test preparation the shortening used was a suspension in cottonseed salad oil of 10% of distilled monoglycerides of predominately $C_{16}$–$C_{18}$ fatty acids derived from lard.

In the sixth test, the batter specific gravity was 0.95, the cake volume 1415 cc. per pound, and the cake peaked on the top center extremely. However, there were no sugar rings or cratering on the top, but the sidewalls of the cake were very low. When the same kind of monoglyceride material was lactated with about one mol of lactic acid and an amount of the resulting lactated monoglyceride-providing material incorporated into the cottonseed salad oil at only a 5% level, the resulting cake batter had specific gravity 0.83. The cake volume was 1360 cc. per pound, the top was desirably flattened, and the texture was excellent.

In a still further cake test using recipe "B" and a shortening compounded from 10% of a soft superglycerinated fat (derived from peanut oil) suspended in cottonseed salad oil, the specific gravity of the batter was 0.935. The batter was smooth and glossy, and it produced a cake having 1350 cc. per pound volume. The top of the cake was good but the texture was coarse and irregular.

*Example 11*

Test layer cakes were made according to recipe "A," above, a typical high ratio recipe especially suitable for commercial production. The fluid shortening used was made in accordance with Example 3 using 6% of the lactated monoglyceride-providing composition (basis shortening), 1% of cottonseed stearine, and 93% cottonseed salad oil. The specific gravity of the batter was 0.790, and the cake volume was 1315 cc. per pound. The cakes made were of superior quality and met all high quality cake criteria.

*Example 12*

The following is presented to show the effects of using a conventional oil shortening in cake in contrast to our present liquid shortening.

A batter was made according to recipe "K" above, using refined peanut oil as the sole shortening. The batter specific gravity was 0.980 at 70° F. It was thin and smooth. The cake volume was 1260 cc. per pound. The top of the layers dipped in the center and had a hard crust, the inner texture was poor, the crumb color was grayish, and the top showed blistering and pitting.

*Example 13*

This example shows the results of sweet dough, recipe "K" above, tests using our liquid shortening in comparison with several conventional plastic shortenings: namely "T" made of lard and containing additionally about 19.6% of monoglycerides and diglycerides of predominantly $C_{16-18}$ fatty acids from superglycerinated fat and a trace of conventional anti-oxidant; also "U" made of lard with about 13% cottonseed stearine hydrogenated to an I.V. between 17 and 20 and containing a trace of conventional antioxidant; also "V" a soybean shortening hydrogenated to a congeal point of 22–23° C. and containing additionally 8% of glycerides derived from superglycerinating a tallow stearine (about 0.4 which was monoglyceride and the balance di- and triglycerides), 0.2% of lecithin, and 6% of a conventional lactated reaction product of lactic acid, free fatty acids (predominantly palmitic and stearic), and glycerine in equimolar ratios; also "W," a mixture of 90% soybean oil hydrogenated to a 26° C. congeal point blended with 10% of the lactated product of a superglycerinated tallow stearine having an I.V. of 0–2, the mol ratios of equivalent glycerine to equivalent fatty acids to lactic acid used in forming this product being 1 to 1 to 1.

The congeal point is measured by heating the fat to 50° C. in a 250 ml. tall-form electrolytic beaker and stirring with a thermometer while it is cooled slowly in a 60° F. water bath. When the thermometer is barely visible, the beaker is dried and warmed in an air bath at 60–70° F., and the highest reading is taken as the congeal point.

The dough was mixed for 10 minutes, and one-ounce buns were made for evaluation. The buns made with the fluid shortening were reported as being unusually tender. The freshness of the buns after various days of aging normally was determined by penetration tests following the method as reported in Cereal Laboratory Methods, Sixth Edition, published by the American Association of Cereal Chemists, 1957, St. Paul, Minnesota, and edited by Emery C. Swanson (page 353, paragraph 85.1c). A change in the test from the reference was the use of 3 cm. diameter plunger, and the plunger plus load weighed 205 grams. The penetrometer used was ASTM Precision Universal type. The only other significant variation from the reference procedure was the use of a uniform one-inch thick slice of the baked sweet dough. The results reported are in tenths of a millimeter penetration, and are the average of three readings.

PENETRATION OF BUN SLICES AT 10 SECONDS WHEREIN THE DOUGH WAS MADE WITH 8% SHORTENING

| Shortening | 1st day | 2d day | 3d day |
|---|---|---|---|
| (V) Plastic | 68 | 33 | 14 |
| (T) Plastic | 70 | 34 | 16 |
| (U) Plastic | 59 | 27 | 10 |
| (W) Plastic | 72 | 33 | 15 |
| Fluid Shortening | 85 | 50 | 20 |

PENETRATION OF BUN SLICES AT 10 SECONDS WHEREIN THE DOUGH WAS MADE WITH 4% SHORTENING

| Shortening | 1st day | 3d day |
|---|---|---|
| (W) Plastic | 51 | 19 |
| (U) Plastic | 47 | 16 |
| (T) Plastic | 74 | 26 |
| Fluid Shortening | 73 | 28 |

*Example 14*

The following cake tests were made using our fluid shortening made in the manner of Example 3 on the one hand, and a high grade conventional plastic shortening (X) made especially for high quality cake recipes on the other. This plastic shortening was "all vegetable," i.e. compounded from hydrogenated soybean and cottonseed fats, the indigenous monoglyceride content being fortified by the incorporation of a small amount of extra free fatty acid monoglycerides (below 5%) from vegetable source. In all comparative tests mixing of the batter with the plastic shortening was done in the usual three stages because of the limitations of this type of material, and the baking times for a particular recipe were the same for cakes made from each shortening to obtain strictly comparative results.

| Recipe | Batter, Sp. Gr. | Cake Volume, cc./lb. | Texture, top, etc., of cake |
|---|---|---|---|
| Yellow Pound (F): | | | |
|   Plastic Shortening (X) | 0.865 | 1,225 | Even, top cracked. |
|   Fluid Shortening | 0.775 | 1,155 | Even, nice top. |
| White Layer (I'): | | | |
|   Plastic Shortening (X) | 1.000 | 1,460 | Even slightly pale, top. |
|   Fluid Shortening | 0.910 | 1,450 | Even, nice top. |
| Rich White Layer (I): | | | |
|   Plastic Shortening (X) | 0.955 | 1,295 | Close and even, some shrinkage. |
|   Fluid Shortening | 0.900 | 1,260 | Close and even, feathery, better texture. |
| Yellow Layer (G): | | | |
|   Plastic Shortening (X) | 0.980 | 1,665 | Top blistered and pale, texture slightly coarse with tendency to tunnel. |
|   Fluid Shortening | 0.875 | 1,675 | Nice smooth top, nice texture. |
| Rich Yellow Layer (similar to "G" with 140% sugar): | | | |
|   Plastic Shortening (X) | 1.00 | 1,640 | Good texture, top slightly uneven. |
|   Fluid Shortening | 0.82 | 1,695 | Good texture, nice smooth top. |
| Devil's Food (E): | | | |
|   Plastic Shortening (X) | 0.94 | 1,640 | Good texture, top slightly uneven. |
|   Fluid Shortening | 0.87 | 1,695 | Good texture, nice smooth top. |
| White Layer (A): | | | |
|   Plastic Shortening (X) | 1.00 | 1,290 | Very slightly coarse, slight sugar ring on top. |
|   Fluid Shortening | 0.826 | 1,290 | Fine and even, nice top. |

| Recipe | Batter, Sp. Gr. | Cake Volume, cc./lb. | Texture, top, etc., of cake |
|---|---|---|---|
| White Layer (A) (batter frozen in pans and baked in same pans directly after removing from freezer): | | | |
|   Plastic Shortening (X) | | 1,240 | Top uneven. |
|   Fluid Shortening | | 1,250 | Top a little peaked, fine, even texture, better quality than the other. |
| White Layer (A) (batter refrigerated overnight at 32° F. in cake pan, then baked directly thereafter): | | | |
|   Plastic Shortening (X) | | 1,240 | Nice top, texture slightly coarser than other and had darker crumb. |
|   Fluid Shortening | | 1,295 | Fine and even, nice smooth top, higher sides than other. |
| White Layer (A) (Batter refrigerated overnight at 32° F. in bulk, then stirred, weighed into pans, and baked directly): | | | |
|   Plastic Shortening (X) | | 1,280 | Both sets of cakes were good and equivalent to those refrigerated in pans, except for some blistering of top. |
|   Fluid Shortening | | 1,300 | |

Additionally the fluid shortening was used with excellent results in the following kinds of cakes: Praline cake—140% sugar; yellow cake—132% sugar; white cake —132% sugar; chocolate fudge cake—150% sugar; and banana cake—140% sugar (recipe H).

*Example 15*

Pie dough for fruit pies and pie shells was made using our fluid shortening made in manner of Example 3 using recipe "O'." The resulting dough was used to make pumpkin pies, pie shells, and apple pies. The crust was excellent and did not tend to shrink as is usual with pie doughs made with ordinary plastic fats. Furthermore, the scraps and trimmings of the dough were found to be reusable without toughening as is the general characteristic of such scraps of typical pie doughs containing plastic fats.

*Example 16*

In the following baking tests pound cakes from Production Pound Cake recipe "D" were made to check their keeping qualities (shelf-life) when using a high grade conventional plastic shortening and our fluid shortening made in accordance with Example 3. For the first two evaluations 16 oz. pound cakes were used and in the last three the cakes were baked simply in larger slabs. The order of preference for freshness was determined by selecting a panel of seven to ten personnel at random and recording their first, second and third choices of preference on the day the cakes were baked, then 5 days later, 7 days later, 11 days later, and 14 days later.

The first plastic shortening was a half-and-half mixture of shortening (X) of Example 14 and another high-grade cake-making plastic "all vegetable" shortening (Y) made in a similar way to (X) except that it had no added monoglyceride. The second plastic shortening was (V) of Example 13. (The recipe using the second plastic shortening was modified slightly to accommodate said second plastic shortening by using a little more water and less shortening. Cakes made from it were eliminated from the testing on the fifth day. All other cakes used straight "D" recipe.

The "liquid sugar" referred to was an aqueous sucrose sirup containing about 2 parts of sugar per part of water, the water so added being compensated for by adjusting the free water of the recipe accordingly. In all other preparations granulated sugar was used.

The test results for the various days and the two-week period are summarized below.

| | Votes of Panel Members in the Rating of Specific Preferences for Cake Made with— | | | |
|---|---|---|---|---|
| | Plastic Shortening (X) and (Y) | Plastic Shortening (V) | Fluid Shortening and Granulated Sugar | Fluid Shortening and Liquid Sugar |
| First Day: | | | | |
|   1st Place | 2 | | 2 | 1 |
|   2nd Place | 1 | | 4 | 3 |
|   3rd Place | 1 | 4 | | 1 |
|   4th Place | 2 | 2 | | 1 |
| Fifth Day: | | | | |
|   1st Place | 1 | 1 | 7 | |
|   2nd Place | 1 | 1 | 1 | 6 |
|   3rd Place | 1 | 5 | 1 | 1 |
|   4th Place | 3 | 1 | | 1 |
| Seventh Day: | | | | |
|   1st Place | 1 | | 2 | 6 |
|   2nd Place | 4 | | 4 | 3 |
|   3rd Place | 4 | | 2 | |
|   4th Place | | | | |
| Eleventh Day: | | | | |
|   1st Place | | | 2 | 6 |
|   2nd Place | 3 | Eliminated from here on | 3 | 2 |
|   3rd Place | 5 | | 2 | 1 |
| Fourteenth Day: | | | | |
|   1st Place | | | 2 | 5 |
|   2nd Place | 2 | | 5 | |
|   3rd Place | 5 | | | 2 |
| Consolidation of Test Preference Votes: | | | | |
|   1st Place | 4 | | 15 | 18 |
|   2nd Place | 13 | | 17 | 15 |
|   3rd Place | 16 | | 5 | 5 |

Since the ingredient formulation was exactly the same in both sets of cakes made with our fluid shortening, the above results could be still further consolidated to show even more dramatically the evidence that the cakes kept fresher longer using our fluid shortening, e.g.:

| | With Plastic Shortening (X) and (Y) | With Fluid Shortening |
|---|---|---|
| 1st Place | 4 | 33 |

*Example 17*

Foam-type cakes such as chiffon cakes heretofore have been difficult to make consistently excellent. The recipes are intolerant to even minor changes of liquid, egg, fat, and sugar content on the one hand, and require ordinarily a multiplicity of stages and a great deal of whipping on the other. Then, too, after the batter is made it must be scaled into pans and baked immediately to guard against loss of quality in the cake. A typical golden or vanilla chiffon recipe is as follows:

| | |
|---|---|
| Cake flour | 8 lbs., 3 oz. |
| Baking powder | oz. 2.75 |
| Salt | oz. 1.25 |
| Granulated sugar | lbs. 3 |

Blend these dry ingredients, then add slowly:

| | |
|---|---|
| Cottonseed salad oil | 1 lb., 12 oz. |
| Egg yolks | 1 lb., 12 oz. |
| Water | lbs. 2 |

Mix the foregoing until smooth, then beat with a paddle beater for one minute. Add the following four ingredients to the above mixture and stir until smooth:

| | |
|---|---|
| Water | oz. 10 |
| Vanilla flavor | oz. 1 |
| Rum flavor | oz. 1 |
| Grated lemon peel | oz. 1 |

In a second vessel whip 3½ lbs. of egg whites into a wet peak and add 1 lb. 10 oz. granulated sugar and 0.25 oz. of cream of tartar slowly. Whip this mixture until firm. Fold the whipped material into the previous blend. Finally, pour into a pan and bake immediately.

Using the same ingredients and proportions except for no cream of tartar, which is not necessary in the following case, and using our fluid shortening as made in accordance with Example 3 in the proportion of 1 lb. 12 oz. instead of the cottonseed oil, we have found that we can make in a single mixing stage tender cake with smaller pores and finer cell walls than said chiffon cake, and one whose batter need not be scaled out with extreme speed to preserve the lightness of the resulting cake.

Accordingly, we mixed all the ingredients in one bowl, adding first the dry ingredients, and then pouring the fluid shortening and wet ingredients including water, whole eggs, or yolks and whites, and flavoring slowly into the dry mixture as it is being whipped with a wire whipper. The resulting mixture was whipped for five minutes at high speed followed by two minutes at medium speed. A stable batter resulted, and it was not critical to weigh it out and start baking in a hurry. The resulting tender cake with fine cell walls resembled in some respects an excellent quality hot buttermilk sponge cake.

Furthermore, we found that, by the use of our fluid shortening, the recipe is less critical to change in proportions of its liquid, egg, and fat ingredients as well as sugar. Furthermore, the proportion of fluid shortening could be raised to make even a tenderer cake than is possible with the conventional recipe.

Hereinbefore we have referred to pouching or bottling our fluid shortening for sale together with our conventional dry cake mixes and the like. Convenient flexible or rigid packages of our fluid shortening can be made up for single consumption, e.g. packages containing a measured quarter or a half cup, so that the metering of the shortening into a batter can be practiced with a substantial gain in convenience. A further extension of our invention involves special and convenient packaging of our lactated monoglyceride-providing composition by itself for incorporation into bakery or domestic batters and doughs. Thus, said composition can be packaged suitably in a dissolved or comminuted state for incorporation into batters and doughs, or extended with various conventional edible ingredients for such use.

An especially suitable adaptation of the packaging of our emulsifier is in squeeze-spray bottles or in aerosol-type containers, suitably compounded with an edible extender such as a softener or a diluent, e.g. refined soybean oil, water, ethanol, or other edible liquid vehicle, if desired. Hence, our lactated monoglycerated-providing composition made, for example in accordance with Example 1, can be packed in pressure containers with a conventional aerosol propellant such as nitrous oxide, nitrogen gas, carbon dioxide, a halogenated propellant, or mixture of same for ejection from an orifice as a stream, a spray, or an aerated foam, much in the manner of shaving cream or whipping cream mixtures. The lactated monoglyceride-providing composition can then be added to cake or other baked goods recipes for imparting desirably improved characteristics thereto. Suitable halogenated propellants include 1,1,1-difluorochlorethane and the like.

A suitable aerosol mixture comprises about 30–75% (by weight) of the propellant and the balance of the straight or extended lactated monoglyceride-providing composition. Edible extenders can be used in amounts up to about 50% by weight of the lactated monoglyceride-providing composition, although ordinarily 5–35% of such modifying ingredients, basis the lactated monoglyceride-providing composition, are preferred. Thus, for example, the addition of an edible, normally liquid glyceride to an otherwise hard, flakelike lactated monoglyceride-providing composition to maintain its smooth ejection from a small orifice as the propellant evaporates is quite in order. Such extender can be a liquid salad oil, a soft, edible, plastic fat, and/or a flavoring extract such as vanilla extract, rum flavor, or the like, and some water can be incorporated also.

In an ordinary two-layer cake, such as for household preparation, about 100 grams of shortening is used. About 3–15 grams of the aerosol-propelled or otherwise dispensed lactated monoglyceride-providing composition into the cake batter mixture or particular fraction thereof during its preparation is in order. In those embodiments of our invention wherein flavoring ingredients such as vanilla extract are used to modify the mixture, there is additionally saved the usually delicate metering of such concentrated flavoring ingredients into the batter or dough.

We claim:

1. An improved fluid shortening for baked goods consisting essentially of: about 0.2% to about 3% of unlactated normally solid glyceride; about 89% to about 95.8% of a normally liquid glyceride vehicle; and about 4% to about 8% of a lactated monoglyceride-providing composition, said composition having about 2% to about 50%, basis the composition, as free monoglyceride of $C_{14-22}$ fatty acid, the lactated monoglyceride of said composition being an esterification product of lactic acid with at least one concentrated, preformed monoglyceride of a $C_{14-22}$ fatty acid and containing about 0.4 to about 2 mols of combined lactic acid per mol of starting monoglyceride reactant, said starting monoglyceride reactant having at least 85% monoglyceride content, said fluid shortening being pourable at a temperature as low as 60° F. and exhibiting an increase in solids content of at least 50% when cooled from 90° to 60° F.

2. The fluid shortening of claim 1 wherein said lactated monoglyceride-providing composition has between 5–35%, basis the composition, as free monoglyceride of $C_{16-22}$ fatty acid, and the lactated monoglyceride contains about 0.5 to 1 mol of combined lactic acid per mol of starting monoglyceride reactant and is an esterification product of lactic acid with at least one concentrated, preformed monoglyceride of $C_{16-22}$ fatty acid.

3. The fluid shortening of claim 2 wherein the normally solid glyceride content is about 0.5–2%, the lactated monoglyceride-providing composition is about 5–7%, and the normally liquid glyceride vehicle is about 91–94.5%.

4. The fluid shortening of claim 2 wherein the normally solid glyceride content is about 1%, the lactated monoglyceride-providing composition is about 6%, and the normally liquid glyceride vehicle is about 93%.

5. The fluid shortening of claim 1 wherein the normally solid glyceride is derived from vegetable fat.

6. The fluid shortening of claim 1 wherein the normally solid glyceride is derived from animal fat.

7. The fluid shortening of claim 1 wherein the glyceride vehicle is derived from vegetable oil.

8. A process for making a fluid shortening exhibiting stability and pourability in the presence of a widely fluctuating solids content in the temperature range of 60 to 90° F. which comprises: forming a clear melt of about 0.2 to about 3% of unlactated normally solid glyceride, about 89% to about 95.8% of normally liquid glyceride vehicle, and about 4% to about 8% of a lactated monoglyceride-providing composition, said composition having about 2% to about 50%, basis the composition, as free monoglyceride of $C_{14-22}$ fatty acid, the lactated monoglyceride of said composition being an esterification product of lactic acid with at least one concentrated, preformed monoglyceride of a $C_{14-22}$ fatty acid and containing about 0.4 to about 2 mols of combined lactic acid per mol of starting monoglyceride reactant, said starting monoglyceride reactant having at least 85% monoglyceride content; cooling said melt to a temperature sufficiently low to generate a magma of crystals; tempering said magma in an agitated tempering zone until the crystals present are in a stable condition; withdrawing the tempered magma from the tempering zone; and maintaining the resulting mixture under conditions precluding substantial aeration of the product during the aforesaid cooling, tempering, and withdrawing steps.

9. The process of claim 8 wherein said lactated monoglyceride-providing composition has between 5–35%, basis the composition, as free monoglyceride of $C_{16-22}$ fatty acid, and the lactated monoglyceride of said composition contains about 0.5 to about 1 mol of combined lactic acid per mol of starting monoglyceride reactant and is an esterification product of lactic acid with at least one concentrated, preformed monoglyceride of $C_{16-22}$ fatty acid; the melt is cooled to a temperature between about 50° and 100° F.; and the tempering of the resulted magma is maintained for at least about one-half hour at a temperature between 90° and 100° F.

10. The process of claim 9 wherein the unlactated normally solid glyceride content is about 0.5–2%, the lactated monoglyceride-providing composition is about 5–7%, and the normally liquid glyceride vehicle is about 91–94.5%.

11. The process of claim 9 wherein the unlactated normally solid glyceride content is about 1%, the lactated monoglyceride-providing composition is about 6%, and the normally liquid glyceride vehicle is about 93%.

12. The process of claim 8 wherein the unlactated normally solid glyceride is derived from vegetable fat.

13. The process of claim 8 wherein the unlactated normally solid glyceride is derived from animal fat.

14. The process of claim 8 wherein the glyceride vehicle is derived from vegetable oil.

15. A lactated monoglyceride-providing composition useful for incorporation into fluid shortening and into baked goods, said composition consisting essentially of: the esterification product of lactic acid with at least one concentrated, preformed monoglyceride of at least one $C_{14-22}$ fatty acid and containing about 0.4 to 1.6 mols of combined lactic acid per mol of starting monoglyceride reactant, said starting monoglyceride reactant having at least 85% monoglyceride content; and about 2–50% of free monoglyceride of at least one $C_{14-22}$ fatty acid.

16. The lactated monoglyceride-providing composition of claim 15 wherein: said monoglyceride reactant and said free monoglyceride are $C_{16-22}$ fatty acid monoglycerides; said esterification product contains about 0.5–1 mol of combined lactic acid per mol of starting monoglyceride reactant; and said free monoglyceride is in a proportion of about 5–35%.

17. The lactated monoglyceride-providing composition of claim 15 wherein said monoglyceride reactant and said free monoglyceride are preponderantly the monoglycerides of at least one fatty acid selected from the group consisting of stearic and palmitic.

18. The lactated monoglyceride-providing composition of claim 15 wherein said monoglyceride reactant and said free monoglyceride are derived from animal fat.

19. The lactated monoglyceride-providing composition of claim 15 wherein said monoglyceride reactant and said free monoglyceride are derived from vegetable fat.

References Cited in the file of this patent

UNITED STATES PATENTS

| | | |
|---|---|---|
| 2,690,971 | Iveson et al. | Oct. 5, 1954 |
| 2,815,286 | Andre et al. | Dec. 3, 1957 |
| 2,835,588 | Alexander et al. | May 20, 1958 |
| 2,849,323 | Young | Aug. 26, 1958 |
| 2,864,705 | Schulman | Dec. 16, 1958 |

OTHER REFERENCES

"The Use of Solid Triglyceride Stearines as Fluid Shortening Ingredients," by Linteris et al., The Journal of The American Oil Chemists' Society, vol. 35, January 1958, pp. 28–32.